United States Patent [19]

Dearborn et al.

[11] Patent Number: 4,896,804
[45] Date of Patent: Jan. 30, 1990

[54] CONVERTIBLE PACK FRAME

[76] Inventors: James C. Dearborn; Ronald R. King, both of 4496 Industrial St., Simi Valley, Calif. 93063

[21] Appl. No.: 176,620
[22] Filed: Mar. 28, 1988
[51] Int. Cl.[4] .................... A45F 4/02; F16M 11/20; B27B 21/00
[52] U.S. Cl. ........................... 224/153; 30/507; 248/188.8
[58] Field of Search ............ 224/153, 155, 156, 259, 224/263; 248/165, 188.8; 108/11, 150, 157; 30/166 R, 507; 7/148, 149; 354/293; 297/1, 118

[56] References Cited

U.S. PATENT DOCUMENTS

| | | | |
|---|---|---|---|
| 1,218,357 | 3/1917 | Bauer | 248/165 X |
| 2,615,485 | 10/1952 | Canter | 30/507 |
| 2,749,949 | 6/1956 | de la Tramerye | 30/166 R |
| 3,225,985 | 12/1965 | Romney | 224/153 |
| 3,335,989 | 8/1967 | Bachmann | 248/188.8 X |
| 3,368,858 | 2/1968 | Motter et al. | 108/150 X |
| 3,912,138 | 10/1975 | Pava | 224/155 X |
| 3,936,109 | 2/1976 | Richardson | 108/150 X |
| 4,248,367 | 2/1981 | Buel | 224/155 X |
| 4,286,739 | 9/1981 | Silcott et al. | 224/153 X |
| 4,738,383 | 4/1988 | Dearborn et al. | 224/153 X |

FOREIGN PATENT DOCUMENTS 1448269  6/1966  France ............................. 354/293

Primary Examiner—Philip R. Coe
Assistant Examiner—Scott J. Haugland
Attorney, Agent, or Firm—Roger A. Marrs

[57] ABSTRACT

A pack frame is disclosed herein having first and second frame sections joined together by tubular segments and adapted to be converted from its usage as a back frame to a multiplicity of other configurations useful as a cutting saw, a gun or camera monopod, a seat and the like. The pack frame is made of metal tubular components having snap-lock connections for ready assembly and disassembly and further includes shoulder straps for supporting the pack frame from a person's shoulders, and a storage bag is detachably carried to the lower portion or section of the frame.

2 Claims, 1 Drawing Sheet

U.S. Patent  Jan. 30, 1990  4,896,804
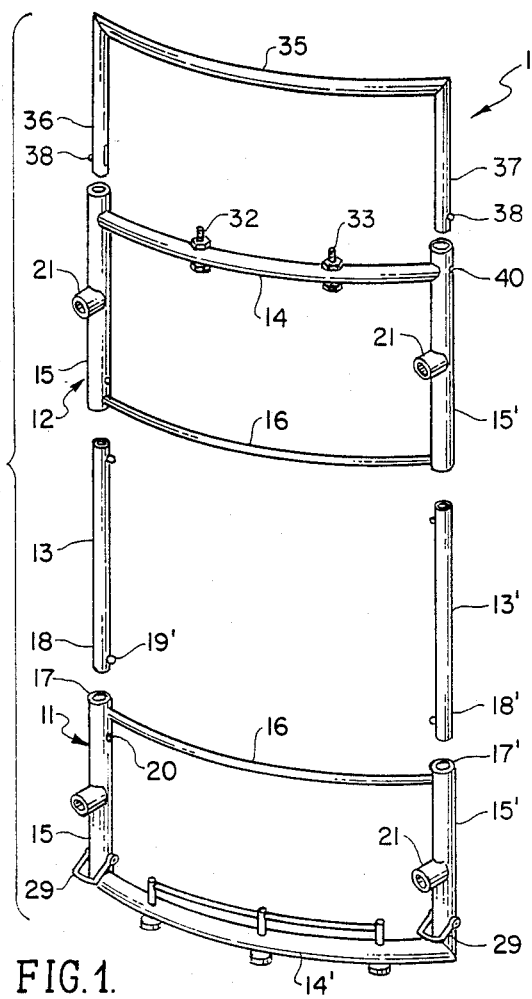
FIG. 1.
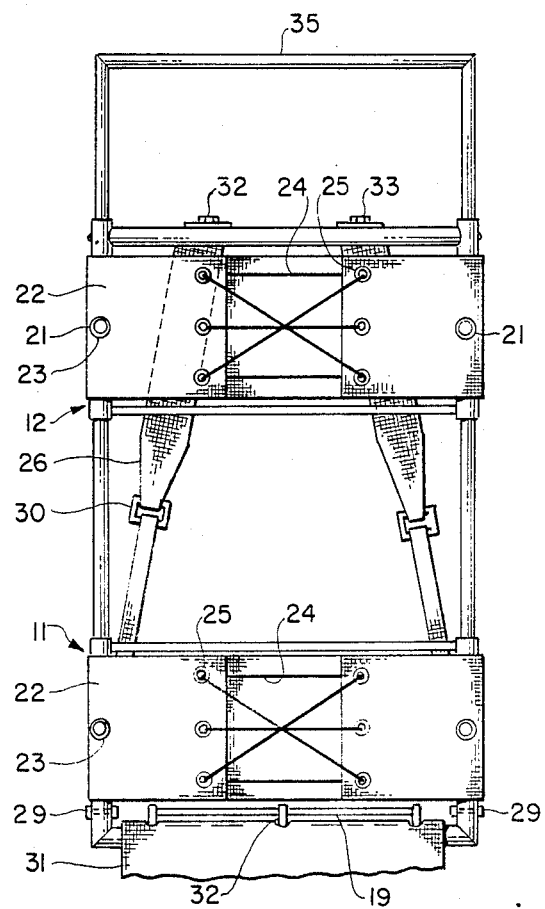
FIG. 2.
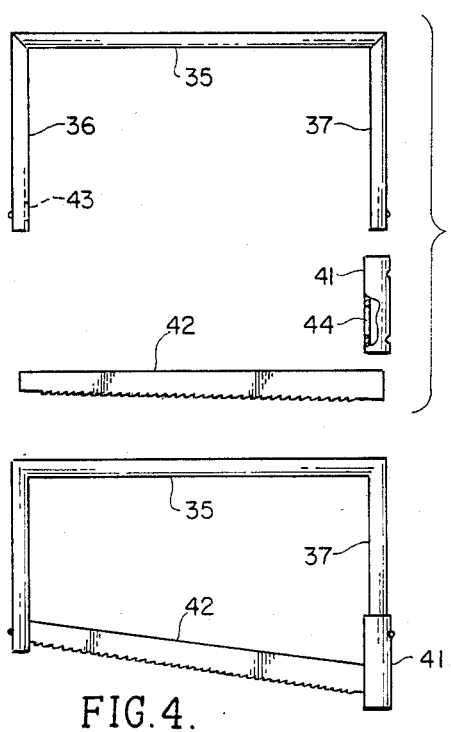
FIG. 3.
FIG. 4.
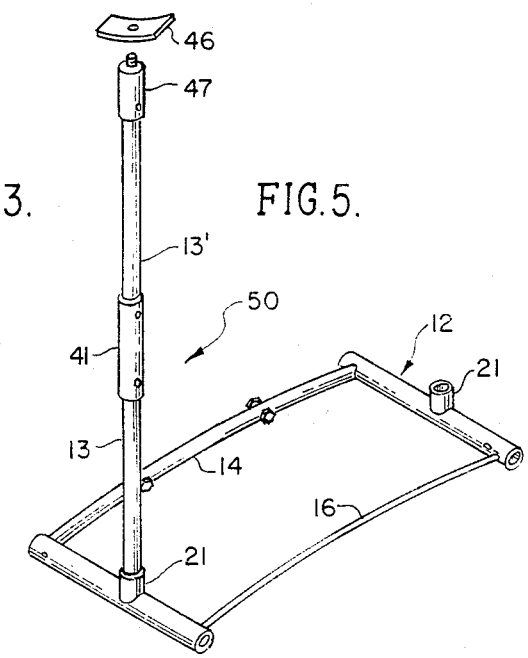
FIG. 5.

CONVERTIBLE PACK FRAME

BACKGROUND OF THE INVENTION

1. Field of the Invention

The present invention relates to the field of back packs and more particularly to a novel pack frame composed of separate sections which are joined together by a variety of components so that a plurality of functions and usages can be obtained from selected arrangement of the components with respect to each other.

2. Brief Description of the Prior Art

In the past, it has been the conventional practice to employ pack frames which are suitable for carrying a variety of loads suspended from the shoulders of a hiker or hunter. In most instances, the pack frame involves a rigid form on which bags are carried or separate items of camping gear are detachably connected. Attempts have been made to expand the use of such back frames by making the frames from separate parts or components which are snapped into connection in order to provide specific utilization. For example, some back frames include sections which may be oriented with respect to one another in order to provide a seat or a bed in addition to its primary function as a pack frame.

Although these previous attempts have been successful in converting the back frame into a variety of functions, such functions and utilizations are still limited to specific areas of utilization and, therefore, cannot be considered universal or readily adaptable to a variety of uses.

Therefore, a long standing need has existed to provie a novel pack frame having component parts which may be readily converted to provide a multiplicity of usages in addition to its primary function or use as that of a back pack. The convertible features should include means for interconnecting various components without the use of tools or special equipment.

SUMMARY OF THE INVENTION

Accordingly, the above problems and difficulties are obviated by the present invention which provides a novel back frame having convertible features which include a a pair of frame sections which are joined together by detachable components and which further include additional components which, when reassembled with the first-mentioned components, provide additional functional devices such as saws, stable monopods or the like.

In one form of the invention, a pair of substantially identical pack frame sections are provided which are joined by tubular side members through the means of snap-lock fasteners. Additional tubular components are provided on one of the frame sections which, when combined with a saw blade, provides a complete saw. The tubular side members, when joined in end-to-end relationship and attached at respective sockets provided on a selected one of the frame sections, produces a monopod stanchion for supporting a gun or camera, as an example.

Therefore, it is among the primary objects of the present invention to provide a convertible pack frame having frame sections and tubular members adapted to be arranged in particular orientations in order to provide a saw or a monopod configuration.

Another object of the present invention is to provide a novel pack frame having convertible features for constructing a hand saw or a monopod support.

Another object of the present invention is to provide a back pack having identical frame sections which may be combined in a first configuration to provide a back pack and which may be combined in a second configuration to provide a hand saw and to provide a third configuration constituting a monopod stanchion support.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is an exploded front perspective view showing the convertible pack frame of the present invention;

FIG. 2 is a front elevational view of the pack frame fully assembled in accordance with the present invention;

FIG. 3 is an exploded view showing the components comprising a hand saw assembled from the pack frame components shown in FIG. 1;

FIG. 4 is a front elevational view showing the hand saw fully assembled from the components illustrated in FIG. 3; and FIG. 5 is a front perspective view showing the components of the pack frame illustrated in FIG. 1 assembled in a different orientation in order to provide a monopod stanchion support.

DESCRIPTION OF THE PREFERRED EMBODIMENT

Referring to FIG. 1, the novel convertible pack frame of the present invention is indicated in the general direction of arrow 10 which is illustrated in exploded view so as to reveal the independent and separate component parts. The pack frame includes a lower sub-assembly frame unit 11 and an upper sub-assembly frame unit 12 that are detachably joined together by snap-lock connection to the opposite ends of a pair of extension bars or tubes 13 and 13'. The various components of the pack frame are preferably made from strong, light-weight, tubular metal parts. Each unit 11 and 12 comprises an arcuate intube 14 and 14' having upright side tubes 15 and 15' welded together at their ends so as to form a general "U"-shaped configuration. An arcuate cross-brace 16 fixedly extends between the free ends of the side tubes 15 and 15' of each frame unit 11 and 12 respectively. The free ends of the side tubes have openings 17 and 17', as illustrated in connection with frame unit 11, for receiving the ends 18 and 18' of the tubular bars 13 and 13' when assembling the pack frame 10. The arcuate members 14, 16 14' and 16' bow outwardly toward a direction which forms a rear side of the pack frame. A detent 19 on the side tube 13 snap-fits into an opening 20 on the end tube for locking the pack frame in assembled position.

A rearwardly projecting, short stub tube 21 welded on each side tube 15 and 15' serves to support a canvas webbing 22 around the frame by being received in an opening 23 provided for it on the web. This latter canvas webbing is shown more clearly in FIG. 2. The webs serve to rest against a person's back comfortably when the back pack is in use. The opposing ends of the webs are attached together by a lacing 24 through the lace holes 25 on the web.

A pair of shoulder straps 26 are suitably attached to the respective frame units 11 and 12 through the use of clevis pins 32 and 33. The lower end of the straps is fitted through rings 29 pivotally attached to the lower unit 11. The strap includes a buckle 30 so as to be adjustable in length. When the pack frame is in use carrying a load, then a storage bag 31 is attached to the lower unit by means of clevis pins 32 and a holding wire 19. The bag may be employed to support the lower end of a load carried on the pack frame.

FIGS. 1 and 2 also disclose the detachable connection to the side members 15 of the upper frame unit 12 with a U-shaped component identified by numeral 35. The U-shaped member 35 includes opposite ends 36 and 37 which are insertably received into the ends of side rods 15 and 15' of the upper unit. Component 35 serves as an extension for the pack frame when detachably connected with the upper section or unit 12. Snap-lock fasteners comprising resilient pins 38 and opening 40 comprise the snap-lock means for detachably assembling the U-shaped component with the upper unit.

When it is desired to reassemble the pack frame into the form of a saw or a monopod support, the frame is disassembled so that the extension component 35 is completely exposed, such as shown in FIG. 3. A stub piece 41 is snap-locked in insertable relationship with the end of the extension component 35, while the opposite ends of a saw blade 42 are received into slots 43 and 44 provided in the respective ends of the stub piece 41 and leg 36 of the extension component. FIGURE 4 shows a fully assembled saw which may be hand-held and used to cut a variety of stock.

Referring now in detail to FIG. 5, a monopod stanchion support is illustrated in the general direction of arrow 50 wherein the upper frame unit 12 has been disconnected from the rest of the pack frame and the respective side members 13 and 13' have been placed in end-to-end relationship by having their opposing ends connected together via tubular piece 41 with the end of side member 13 inserted into the socket 21, while the extreme opposite end of tube or member 13' is fitted with a cradle 46 optionally intended to be carried on a mount 47 detachably connected to the extreme end of the tube 13'. By this means, a support is provided for a gun or camera and the upper frame unit 12 provides a stable platform on which the monopod stanchion is supported.

Therefore, it can be seen from the foregoing that the pack frame 10 may be formed from a plurality of components which are snap-locked together to form the frame shown in FIG. 2. In this fashion, the frame may be used for carrying a variety of loads on the shoulders of a person either hiking, hunting or camping, for example. Also, when it is desired by the user to construct a saw for cutting purposes, the extension component 35 may be readily disconnected from the upper frame unit 12 and by inclusion of the saw blade 42 with the stub or connection piece 44, a useful saw is produced, as shown in FIG. 4. If it is the desire of the user to provide a stable platform for mounting a gun, camera or the like, the monopod support shown in FIG. 5 can readily be assembled from the pack frame components by connecting the side members 13 and 13' together via piece 41 and the end of tube or member 13 can be inserted into the socket 21 for upright securement. A suitable camera or other device can then be mounted on the upper end of the tube or member 13' via mount 47.

Also, the extension 35 can be used to increase the length of the total frame or by inserting the legs 36 and 37 into the sockets 21 of either frame unit, a shelf is provided. The shelf would outwardly project in cantilevered fashion normal to the frame unit on which a variety of items may be supported.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a portable take-apart pack frame convertible between a back pack configuration and a monopod configuration, the combination comprising:
   a first unit of rigid rectangular structure;
   a second unit of rigid rectangular structure;
   said first and said second units being similarly constructed as U-shaped members having a pair of parallel spaced-apart side members joined at one end by an arcuate cross element and at their opposite ends by an arcuate cross brace;
   said side members having ends;
   each of said side member ends adjacent to said cross brace terminating in an open socket having a central axis along the longitudinal axis of each of said respective side members;
   each of said side members further having an open socket having a transverse axis normal to the longitudinal axis of said side member;
   a pair of linear elongated rods having opposite ends insertably and selectively receivable into said open sockets having said transverse axis normal to the longitudinal axis of said side member to define said monopod configuration and insertably and selectively receivable into said open sockets having a central axis along the longitudinal axis of said side member to define said back pack configuration; and
   said open sockets having a central axis along the side member longitudinal axis occupied by said rod ends to constitute said back pack configuration and said open sockets having a transverse axis normal to said side member longitudinal axis occupied by said rod ends to constitute said monopod configuration;
   said pair of rods are coupled end-to-end insertably supported in a selected one of said open sockets to project vertically supported from a single one of said units when said monopod configuration is defined;
   a "U"-shaped extension having free ends selectively and detachably coupled to said first unit; and
   a saw blade detachably coupled to said free ends of said "U"-shaped extension when not coupled to said first unit so as to constitute a complete hand saw.

2. The invention as defined in claim 1 including:
   a spacer piece disposed between one end of said extension and one end of said saw.

* * * * *